(12) United States Patent
Zhou et al.

(10) Patent No.: US 10,495,870 B2
(45) Date of Patent: Dec. 3, 2019

(54) DISPLAY PANEL, DISPLAY DEVICE, AND CONTROL METHOD THEREFOR

(71) Applicant: BOE Technology Group Co., Ltd., Beijing (CN)

(72) Inventors: Tingting Zhou, Beijing (CN); Yonglian Qi, Beijing (CN); Bin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 42 days.

(21) Appl. No.: 15/737,200

(22) PCT Filed: Jun. 27, 2017

(86) PCT No.: PCT/CN2017/090316
§ 371 (c)(1),
(2) Date: Dec. 15, 2017

(87) PCT Pub. No.: WO2018/001240
PCT Pub. Date: Jan. 4, 2018

(65) Prior Publication Data
US 2018/0373022 A1    Dec. 27, 2018

(30) Foreign Application Priority Data
Jun. 30, 2016    (CN) .......................... 2016 1 0504795

(51) Int. Cl.
*G02B 26/00*    (2006.01)

(52) U.S. Cl.
CPC ......... *G02B 26/005* (2013.01); *G02B 26/007* (2013.01)

(58) Field of Classification Search
CPC .... G02B 26/005; G02B 26/02; G02B 26/004; G02B 26/007; G09G 3/348
(Continued)

(56) References Cited

U.S. PATENT DOCUMENTS

| 7,274,416 | B2 | 9/2007 | Feenstra et al. |
| 8,059,328 | B1 * | 11/2011 | Kuo ..................... G02B 26/005 |
| | | | 359/290 |

(Continued)

FOREIGN PATENT DOCUMENTS

| CN | 101546084 A | 9/2009 |
| CN | 102411203 A | 4/2012 |

(Continued)

OTHER PUBLICATIONS

English Translation of International Search Report and Box V of Written Opinion from International Patent Application No. PCT/CN2017/090316, dated Sep. 21, 2017, 7 pages.

*Primary Examiner* — Mohammed A Hasan
(74) *Attorney, Agent, or Firm* — Westman, Champlin & Koehler, P.A.

(57) ABSTRACT

A display panel, a display device, and a control method therefor are disclosed. The display panel includes a first substrate and a second substrate and a plurality of first pixels between the first substrate and the second substrate; wherein, at least one of the plurality of first pixels comprises: a first insulating layer on the first substrate; a second insulating layer on the second substrate; a first colored fluid layer contacted with and having the same hydrophilicity/hydrophobicity as that of a surface of the first insulating layer; a second colored fluid layer contacted with and having the same hydrophilicity/hydrophobicity as that of a surface of the second insulating layer; and a first transparent conductive fluid disposed between the first colored fluid layer and the second colored fluid layer and having a hydrophilicity/hydrophobicity contrary to those of the first colored fluid layer and the second colored fluid layer.

20 Claims, 10 Drawing Sheets

US 10,495,870 B2

Page 2

(58) Field of Classification Search
USPC .......................................................... 359/290
See application file for complete search history.

(56) References Cited

U.S. PATENT DOCUMENTS

| | | |
|---|---|---|
| 8,810,882 B2 | 8/2014 | Heikenfeld et al. |
| 9,180,454 B2 | 11/2015 | Heikenfeld et al. |
| 2007/0019006 A1 | 1/2007 | Marcu et al. |
| 2009/0244441 A1* | 10/2009 | Nagato ............... G02F 1/13475 349/78 |
| 2011/0140996 A1* | 6/2011 | Parry-Jones ......... G02B 26/005 345/60 |
| 2012/0154886 A1 | 6/2012 | Heikenfeld et al. |
| 2012/0243071 A1 | 9/2012 | Lee et al. |
| 2015/0146274 A1* | 5/2015 | Kim ....................... G02B 26/02 359/228 |

FOREIGN PATENT DOCUMENTS

| | | |
|---|---|---|
| CN | 102652280 A | 8/2012 |
| CN | 102692778 A | 9/2012 |
| CN | 103026294 A | 4/2013 |
| CN | 106157868 A | 11/2016 |
| WO | 03071347 A1 | 8/2003 |

* cited by examiner

DISPLAY PANEL, DISPLAY DEVICE, AND CONTROL METHOD THEREFOR

The present application is a Section 371 National Stage Application of International Application No. PCT/CN2017/090316, filed Jun. 27, 2017, which is not yet published, and claims a priority of CN Patent Application No. 201610504795.9, filed on Jun. 30, 2016, the entire content thereof being incorporated herein as a part of the present application by reference.

TECHNICAL FIELD

The embodiments of the present disclosure relate to the technical field of display, and particularly to a display panel, a display device, and a control method therefor.

BACKGROUND ART

Electrowetting refers to a phenomenon where by changing the voltage between a droplet and an insulating substrate, the wettability of the droplet on the insulating substrate is changed (i.e., the contact angle is changed), such that the droplet is deformed or displaced. Wetting means that liquid can spread on a solid surface, and the contact area tends to increase, that is, the adhesion of the liquid to the solid surface is greater than the cohesion of the liquid. Non-wetting means that liquid cannot spread on a solid surface, and the contact area tends to shrink to form a spherical shape, that is, the adhesion of the liquid to the solid surface is smaller than the cohesion of the liquid.

Electrowetting display technology makes use of the electrowetting phenomenon to control an ink droplet as a pixel. For example, when the ink droplet shrinks to a dot shape, the pixel presents white color; and when the ink droplet spreads on the pixel surface, the pixel presents the color of the ink. Electrowetting display technology attracts more and more attention due to the advantages of bistable displaying, good reflectivity, low power consumption, broad temperature range, sufficiently quick response speed and so on. Therefore, there is a need to continuously improve the display performances of the electrowetting display device.

SUMMARY

The embodiments of the present disclosure provide a display panel, a display device, and a control method therefor, which achieve improved display performances.

According to a first aspect of the present disclosure, provided is a display panel comprising a first substrate and a second substrate disposed opposite to each other, and a plurality of first pixels disposed between the first substrate and the second substrate. At least one of the plurality of first pixels comprises a first insulating layer on the first substrate; a second insulating layer on the second substrate; a first colored fluid layer with a first color, having the same hydrophilicity/hydrophobicity as that of a surface of the first insulating layer, and contacted (directly) with the surface of the first insulating layer; a second colored fluid layer with a second color, having the same hydrophilicity/hydrophobicity as that of a surface of the second insulating layer, and contacted (directly) with the surface of the second insulating layer; and a first transparent conductive fluid disposed between the first colored fluid layer and the second colored fluid layer and having a hydrophilicity/hydrophobicity contrary to those of the first colored fluid layer and the second colored fluid layer. The first colored fluid layer is configured to be present as dot shape or spread along the surface of the first insulating layer in a first electric field. The second colored fluid layer is configured to be present as dot shape or spread along the surface of the second insulating layer in a second electric field.

In one embodiment of the present disclosure, the plurality of first pixels are separated from each other by a pixel wall. The least one of the plurality of first pixels further comprises: a common electrode disposed on the pixel wall and configured to apply a common voltage to the first transparent conductive fluid; a first pixel electrode disposed between the first insulating layer and the first substrate and configured to generate the first electric field to act on the first colored fluid layer; and a second pixel electrode disposed between the second insulating layer and the second substrate and configured to generate the second electric field to act on the second colored fluid layer.

In one embodiment of the present disclosure, the least one of the plurality of first pixels further comprises: a first switch coupled with the first pixel electrode and configured to control the first pixel electrode; and a second switch coupled with the second pixel electrode and configured to control the second pixel electrode.

In one embodiment of the present disclosure, one of the first and the second colors is one color selected from red, green and blue, and the other one of the first and the second colors is the complementary color to the one color.

In one embodiment of the present disclosure, the first colored fluid layer is positioned on one side of left and right sides of the at least one of the plurality of first pixels when present as dot shape. The second colored fluid layer is positioned on the other side of left and right sides of the at least one of the plurality of first pixels when present as dot shape.

In one embodiment of the present disclosure, the display panel further comprises: a plurality of second pixels disposed between the first substrate and the second substrate. At least one of the plurality of second pixels is disposed adjacent to the at least one of the plurality of first pixels. The at least one of the plurality of second pixels comprises the first insulating layer on the first substrate; the second insulating layer on the second substrate; a third colored fluid layer with a third color, having the same hydrophilicity/hydrophobicity as that of a surface of the first insulating layer, and contacted (directly) with the surface of the first insulating layer; a fourth colored fluid layer with a fourth color, having the same hydrophilicity/hydrophobicity as that of a surface of the second insulating layer, and contacted (directly) with the surface of the second insulating layer; and a second transparent conductive fluid disposed between the third colored fluid layer and the fourth colored fluid layer and having a hydrophilicity/hydrophobicity contrary to those of the third colored fluid layer and the fourth colored fluid layer. The third colored fluid layer is configured to be present as dot shape or spread along the surface of the first insulating layer in a third electric field. The fourth colored fluid layer is configured to be present as dot shape or spread along the surface of the second insulating layer in a fourth electric field.

In one embodiment of the present disclosure, the plurality of second pixels are separated from each other by a pixel wall. The at least one of the plurality of second pixels and the at least one of the plurality of first pixels which are adjacent are separated from each other by a pixel wall. At least one of the plurality of second pixels further comprises: a common electrode disposed on the pixel wall and configured to apply a common voltage to the second transparent conductive fluid; a third pixel electrode disposed between the first insulating layer and the first substrate and configured to generate the third electric field to act on the third colored fluid layer; and a fourth pixel electrode disposed between the second insulating layer and the second substrate and configured to generate the fourth electric field to act on the fourth colored fluid layer.

In one embodiment of the present disclosure, the at least one of the plurality of second pixels further comprises: a third switch coupled with the third pixel electrode and configured to control the third pixel electrode; and a fourth switch coupled with the fourth pixel electrode and configured to control the fourth pixel electrode.

In one embodiment of the present disclosure, the first transparent conductive fluid and the second transparent conductive fluid are the same. The at least one of the plurality of second pixels and the at least one of the plurality of first pixels which are adjacent are separated from each other by a pixel wall. An opening is provided on the pixel wall. A distance between the opening and the first insulating layer is greater than a thickness of each of the first colored fluid layer and the third colored fluid layer when present as dot shape. A distance between the opening and the second insulating layer is greater than a thickness of each of the second colored fluid layer and the fourth colored fluid layer when present as dot shape.

In one embodiment of the present disclosure, a surface of the pixel wall has the same hydrophilicity/hydrophobicity as those of the first and second transparent conductive fluids.

In one embodiment of the present disclosure, the first colored fluid layer, the second colored fluid layer, the third colored fluid layer and the fourth colored fluid layer are ink. The first and second transparent conductive fluids are hydrophilic.

In one embodiment of the present disclosure, one of the first and second colors is one color selected from red, green and blue, and the other one of the first and second colors is the complementary color to the one color. One of the third and fourth colors is another color selected from red, green and blue, and the other one of the third and fourth colors is the complementary color to the another color.

In one embodiment of the present disclosure, the first colored fluid layer is positioned on one side of left and right sides of the at least one of the plurality of first pixels when present as dot shape, and the second colored fluid layer is positioned on the other side of left and right sides of the at least one of the plurality of first pixels when present as dot shape. The third colored fluid layer is positioned on one side of left and right sides of the at least one of the plurality of second pixels when present as dot shape, and the fourth colored fluid layer is positioned on the other side of left and right sides of the at least one of the plurality of second pixels when present as dot shape.

In one embodiment of the present disclosure, the first color is green, the second color is magenta, the third color is red, and the fourth color is cyan.

In one embodiment of the present disclosure, the first color is green, the second color is magenta, the third color is blue, and the fourth color is yellow.

In one embodiment of the present disclosure, the first color is red, the second color is cyan, the third color is blue, and the fourth color is yellow.

According to a second aspect of the present disclosure, provided is a display device comprising the display panel according to the first aspect described above.

In one embodiment of the present disclosure, the display device further comprises a quantum dot backlight source.

According to a third aspect of the present disclosure, provided is a control method for the display panel according to the first aspect described above. The control method comprises: applying an electric field with a first predetermined intensity to the first and second colored fluid layers, to allow the first and second colored fluid layers to be present as dot shape, so as to display white color. The control method further comprises: applying an electric field with a second predetermined intensity and the electric field with the first predetermined intensity to the first and second colored fluid layers respectively, to allow the first colored fluid layer to spread to cover the surface of the first insulating layer corresponding to the first pixel, and to allow the second colored fluid layer to be present as dot shape, so as to display the first color. The control method further comprises: applying the electric field with the first predetermined intensity and the electric field with the second predetermined intensity to the first and second colored fluid layers respectively, to allow the first colored fluid layer to be present as dot shape, and to allow the second colored fluid layer to spread to cover the surface of the second insulating layer corresponding to the first pixel, so as to display the second color. The control method further comprises: applying the electric field with the second predetermined intensity to the first and second colored fluid layers, to allow the first colored fluid layer to spread to cover the surface of the first insulating layer corresponding to the first pixel, and to allow the second colored fluid layer to spread to cover the surface of the second insulating layer corresponding to the first pixel, so as to display a common color component of the first color and the second color.

According to a fourth aspect of the present disclosure, provided is a control method for the display panel according to the first aspect described above. The control method comprises: applying an electric field with a first predetermined intensity to the first to fourth colored fluid layers, to allow the first to fourth colored fluid layers to be present as dot shape, so as to display white color. The control method further comprises: applying an electric field with a second predetermined intensity to the first to fourth colored fluid layers, to allow the first and third colored fluid layers to spread to cover the surface of the first insulating layer corresponding to the first and second pixels, and to allow the second and fourth colored fluid layers to spread to cover the surface of the second insulating layer corresponding to the first and second pixels, so as to display black color. The control method further comprises: applying the electric field with the first predetermined intensity to one colored fluid layer with the complementary color to one color selected from red, green and blue, and applying the electric field with the second predetermined intensity to the other three colored fluid layers, so as to display the one color selected from red, green and blue. The control method further comprises: applying the electric field with the first predetermined intensity to one colored fluid layer with the complementary color to another color selected from red, green and blue, and applying the electric field with the second predetermined intensity to the other three colored fluid layers, so as to display the another color selected from red, green and blue. The control method further comprises: applying the electric field with the first predetermined intensity to two colored fluid layers respectively with the one color and the another color, and applying the electric field with the second predetermined intensity to the other two colored fluid layers, so as to display the third color other than the one color and the another color, selected from red, green and blue.

In one embodiment of the present disclosure, the control method further comprises: applying corresponding electric fields to the first to fourth colored fluid layers respectively, in such a manner that when observing perpendicular to the display panel, the first and second colored fluid layers spread without overlapping with each other, and the third and fourth colored fluid layers spread without overlapping with each other, so as to display a mixed color of red, green and blue.

BRIEF DESCRIPTION OF DRAWINGS

To more clearly illustrate the technical solutions of the embodiments of the present disclosure, the drawings of the embodiments will be briefly described below. Obviously, the following structural schematic diagrams in the drawings are not necessarily to be drawn to scale, rather they present various features in a simplified form. Also, the drawings in the following description are only some embodiments of the present disclosure, and are not intended to limit the present disclosure.

DETAILED DESCRIPTION

In order to make the objects, technical solutions and advantages of the present disclosure more clear, the technical solutions of the embodiments of the present disclosure will be described in detail below in combination with the drawings of the embodiments of the present disclosure. Obviously, the embodiments described are only a part of, but not all of the embodiments of the present disclosure. All of other embodiments obtained by those skilled in the art based on the embodiments described, without inventive efforts, fall within the protection scope of the present disclosure.

All of the existing display modes use three sub-pixels of red, green and blue (RGB) or four sub-pixels of red, green, blue and white (RGBW) to display full color. At least one embodiment of the present disclosure provides a display panel, a display device, and a control method therefor, which can achieve full color display with two pixels, such that the display resolution is increased by 33%. Hereinafter, the display panel, the display device, and the control method therefor of the present disclosure will be described in detail with corresponding embodiments.

I. Display Panel

Figure 1A:
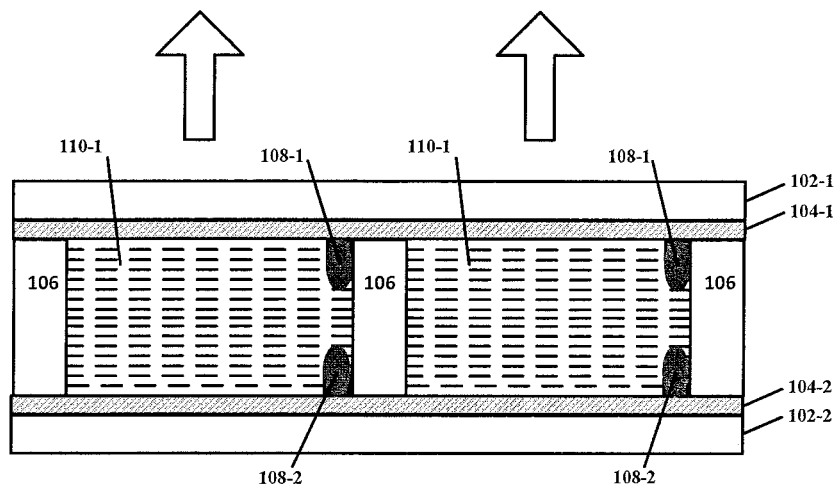
FIGS. 1A-1I are schematic diagrams showing the cross sectional views of display panels according to embodiments of the present disclosure.

FIG. 1A is a schematic diagram showing the cross sectional view of a display panel according to a first embodiment of the present disclosure. As shown in FIG. 1A, the display panel of the first embodiment comprises: a first substrate 102-1 and a second substrate 102-2 disposed opposite to each other, which may be made from suitable materials such as glass, plastic or the like; and a plurality of first pixels disposed between the first substrate 102-1 and the second substrate 102-2. The plurality of first pixels may be separated from each other by a pixel wall 106 as shown in the figure. The first pixel comprises: a first insulating layer 104-1 disposed on the first substrate 102-1; a second insulating layer 104-2 disposed on the second substrate 102-2; a first colored fluid layer 108-1 with a first color, having the same hydrophilicity/hydrophobicity as that of a surface of the first insulating layer 104-1, and contacted with the surface of the first insulating layer 104-1; a second colored fluid layer 108-2 with a second color, having the same hydrophilicity/hydrophobicity as that of a surface of the second insulating layer 104-2, and contacted with the surface of the second insulating layer 104-2; and a first transparent conductive fluid 110-1 which has a hydrophilicity/hydrophobicity contrary to those of the first colored fluid layer 108-1 and the second colored fluid layer 108-2 and thus can form interfaces with the first colored fluid layer 108-1 and the second colored fluid layer 108-2. The first colored fluid layer 108-1 is configured to be present as dot shape or spread along the surface of the first insulating layer 104-1 under an action of an electric field, and the second colored fluid layer 108-2 is configured to be present as dot shape or spread along the surface of the second insulating layer 104-2 under an action of an electric field. The phrase of "the same hydrophilicity/hydrophobicity" in the present disclosure is a qualitative term, not a quantitative term, meaning that the two objects have similar hydrophilicity/hydrophobicity as long as they have the same or similar hydrophilic or hydrophobic behavior.

As such, when both of the first colored fluid layer 108-1 and the second colored fluid layer 108-2 are present as dot shape, the color of a light emitted by a backlight source used with the display panel, i.e. white color, can be displayed. When the first colored fluid layer 108-1 spreads to cover the surface of the first insulating layer 104-1 corresponding to the first pixel and the second colored fluid layer 108-2 is present as dot shape, the color of the first colored fluid layer 108-1, i.e. the first color, can be displayed. When the first colored fluid layer 108-1 is present as dot shape and the second colored fluid layer 108-2 spreads to cover the surface of the second insulating layer 104-2 corresponding to the first pixel, the color of the second colored fluid layer 108-2, i.e. the second color, can be displayed. When the first colored fluid layer 108-1 spreads to cover the surface of the first insulating layer 104-1 corresponding to the first pixel and the second colored fluid layer 108-2 spreads to cover the surface of the second insulating layer 104-2 corresponding to the first pixel, the common color component of the first color and the second color can be displayed.

Figure 1B:
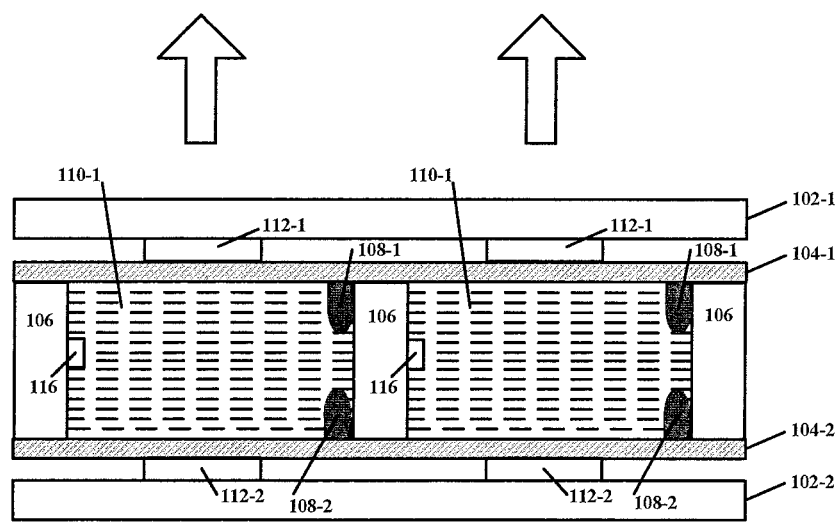

FIG. 1B is a schematic diagram showing the cross sectional view of a display panel according to a second embodiment of the present disclosure. The second embodiment differs from the first embodiment in that the first pixel of the second embodiment further comprises: a common electrode 116 disposed on the pixel wall 106 and configured to apply a common voltage to the first transparent conductive fluid 110-1; a first pixel electrode 112-1 disposed between the first insulating layer 104-1 and the first substrate 102-1 and configured to generate a first electric field to act on the first colored fluid layer 108-1; and a second pixel electrode 112-2 disposed between the second insulating layer 104-2 and the second substrate 102-2 and configured to generate a second electric field to act on the second colored fluid layer 108-2. Although the figure shows that the first pixel electrode 112-1 only covers a part of the surface of the first insulating layer 104-1, the first pixel electrode 112-1 may also cover the whole surface, and it is not particularly limited in the present application. The same is also applicable for the second pixel electrode 112-2.

Figure 1C:
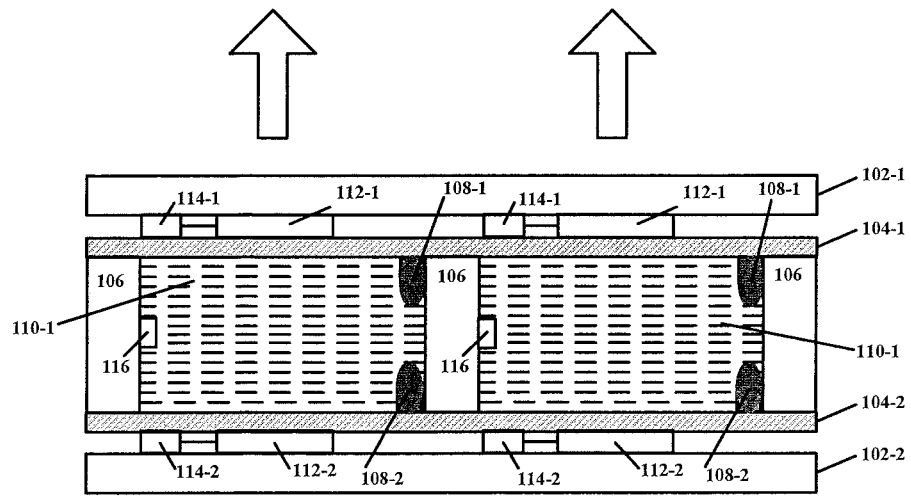

FIG. 1C is a schematic diagram showing the cross sectional view of a display panel according to a third embodiment of the present disclosure. The third embodiment differs from the second embodiment in that the first pixel of the third embodiment further comprises: a first switch 114-1 coupled with the first pixel electrode 112-1 and configured to control the powering of the first pixel electrode 112-1; and a second switch 114-2 coupled with the second pixel electrode 112-2 and configured to control the powering of the second pixel electrode 112-2. A plurality of first pixel electrodes 112-1 and a plurality of first switches 114-1 as well as a plurality of second pixel electrodes 112-2 and a plurality of second switches 114-2 corresponding to the plurality of first pixels can be achieved by means of the technology similar with that for fabricating an array substrate of a crystal liquid panel, which will not be reiterated herein.

Figure 1D:
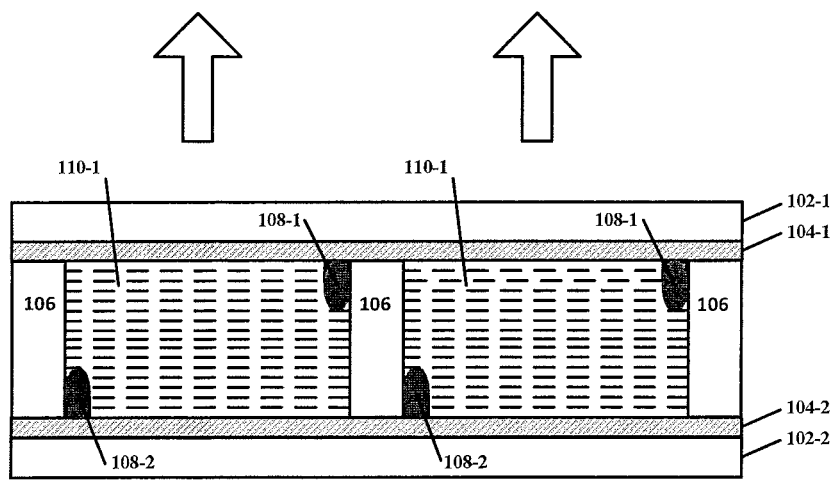

FIG. 1D is a schematic diagram showing the cross sectional view of a display panel according to a fourth embodiment of the present disclosure. The fourth embodiment differs from the first embodiment in that: in the fourth embodiment, the first colored fluid layer 108-1 is positioned on one side of left and right sides of the first pixel when present as dot shape, and the second colored fluid layer 108-2 is positioned on the other side of left and right sides of the first pixel when present as dot shape (the phrase "be positioned on the left side of the pixel" herein means that colored fluid layer may cover a part of the left side of the pixel, for example, is located in a corner, and may cover the whole left side of the pixel. The same is also applicable for "be positioned on the right side of the pixel"). However, in the first embodiment, the relative position between the first colored fluid layer and the second colored fluid layer is not particularly limited.

As such, in the fourth embodiment, when observing perpendicular to the display panel, the first colored fluid layer 108-1 and the second colored fluid layer 108-2 can spread without overlapping with each other, such that a mixed color of the first color and the second color can be displayed.

In the first to fourth embodiments above, one of the first and second colors may be one color selected from three primary colors (red, green and blue), and the other one of the first and second colors may be the complementary color to the one color. As such, in addition to that white color, the one color and the complementary color thereto can be displayed, the color of the backlight can be fully absorbed by two colored fluid layers whose colors are complementary to each other, when the first colored fluid layer 108-1 spreads to cover the surface of the first insulating layer 104-1 corresponding to the first pixel and the second colored fluid layer 108-2 spreads to cover the surface of the second insulating layer 104-2 corresponding to the first pixel, so as to display black color.

Figure 1E:
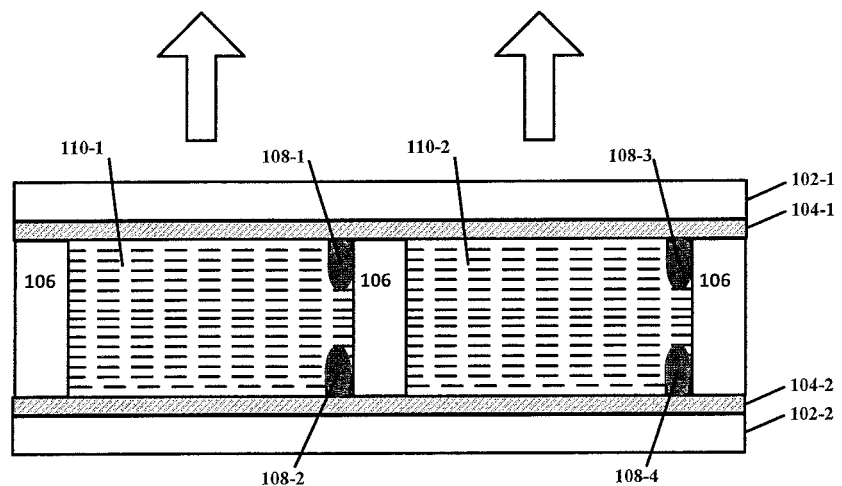

FIG. 1E is a schematic diagram showing the cross sectional view of a display panel according to a fifth embodiment of the present disclosure. The fifth embodiment differs from the first embodiment in that: in the fifth embodiment, in addition to the foregoing plurality of first pixels, the display panel further comprises a plurality of second pixels, and at least one of the plurality of second pixels is disposed adjacent to at least one of the plurality of first pixels (for example, a row of first pixels are adjacent to a row of second pixels, and the respective first pixel and second pixel in the same column are arranged alternatively). The plurality of second pixels are disposed between the first substrate 102-1 and the second substrate 102-2, and may be separated from each other by a pixel wall. The second pixel comprises: a first insulating layer 104-1 disposed on the first substrate 102-1; a second insulating layer 104-2 disposed on the second substrate 102-2; a third colored fluid layer 108-3 with a third color, having the same hydrophilicity/hydrophobicity as that of a surface of the first insulating layer 104-1, and contacted with the surface of the first insulating layer 104-1; a fourth colored fluid layer 108-4 with a fourth color, having the same hydrophilicity/hydrophobicity as that of a surface of the second insulating layer 104-2, and contacted with the surface of the second insulating layer 104-2; and a second transparent conductive fluid 110-2 which has a hydrophilicity/hydrophobicity contrary to those of the third colored fluid layer 108-3 and the fourth colored fluid layer 108-4 and thus can form interfaces with the third colored fluid layer 108-3 and the fourth colored fluid layer 108-4. The third colored fluid layer 108-3 is configured to be present as dot shape or spread along the surface of the first insulating layer 104-1 under an action of an electric field, and the fourth colored fluid layer 108-4 is configured to be present as dot shape or spread along the surface of the second insulating layer 104-2 under an action of an electric field.

As such, similar with the first embodiment, when both of the third colored fluid layer 108-3 and the fourth colored fluid layer 108-4 are present as dot shape, the color of a light emitted by a backlight source used with the display panel, i.e. white color, can be displayed. When the third colored fluid layer 108-3 spreads to cover the surface of the first insulating layer 104-1 corresponding to the second pixel and the fourth colored fluid layer 108-4 is present as dot shape, the color of the third colored fluid layer 108-3, i.e. the third color, can be displayed. When the third colored fluid layer 108-3 is present as dot shape and the fourth colored fluid layer 108-4 spreads to cover the surface of the second insulating layer 104-2 corresponding to the second pixel, the color of the fourth colored fluid layer 108-4, i.e. the fourth color, can be displayed. When the third colored fluid layer 108-3 spreads to cover the surface of the first insulating layer 104-1 corresponding to the second pixel and the fourth colored fluid layer 108-4 spreads to cover the surface of the second insulating layer 104-2 corresponding to the second pixel, the common color component of the third color and the fourth color can be displayed.

Figure 1F:
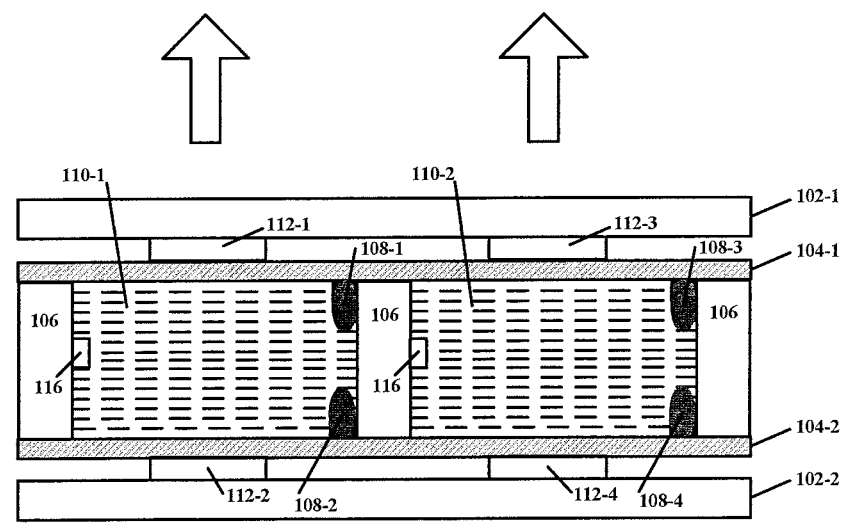

FIG. 1F is a schematic diagram showing the cross sectional view of a display panel according to a sixth embodiment of the present disclosure. The sixth embodiment differs from the fifth embodiment in that the first pixel of the sixth embodiment further comprises: a common electrode 116 disposed on the pixel wall 106 and configured to apply a common voltage to the first transparent conductive fluid 110-1; a first pixel electrode 112-1 disposed between the first insulating layer 104-1 and the first substrate 102-1 and configured to generate a first electric field to act on the first colored fluid layer 108-1; and a second pixel electrode 112-2 disposed between the second insulating layer 104-2 and the second substrate 102-2 and configured to generate a second electric field to act on the second colored fluid layer 108-2. The second pixel further comprises: a common electrode 116 disposed on the pixel wall 106 and configured to apply a common voltage to the second transparent conductive fluid 110-2; a third pixel electrode 112-3 disposed between the first insulating layer 104-1 and the first substrate 102-1 and configured to generate a third electric field to act on the third colored fluid layer 108-3; and a fourth pixel electrode 112-4 disposed between the second insulating layer 104-2 and the second substrate 102-2 and configured to generate a fourth electric field to act on the fourth colored fluid layer 108-4.

Figure 1G:
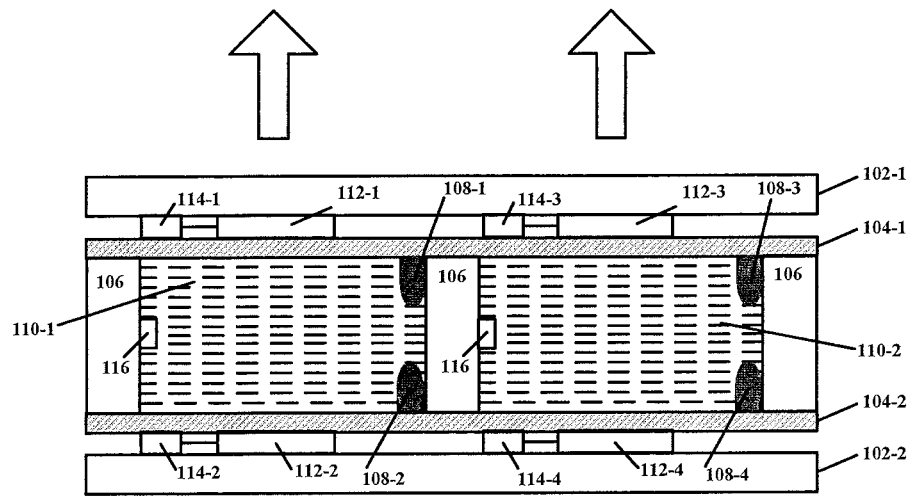

FIG. 1G is a schematic diagram showing the cross sectional view of a display panel according to a seventh embodiment of the present disclosure. The seventh embodiment differs from the sixth embodiment in that the first pixel of the seventh embodiment further comprises: a first switch 114-1 coupled with the first pixel electrode 112-1 and configured to control the powering of the first pixel electrode 112-1; and a second switch 114-2 coupled with the second pixel electrode 112-2 and configured to control the powering of the second pixel electrode 112-2. The second pixel further comprises: a third switch 114-3 coupled with the third pixel electrode 112-3 and configured to control the powering of the third pixel electrode 112-3; and a fourth switch 114-4 coupled with the fourth pixel electrode 112-4 and configured to control the powering of the fourth pixel electrode 112-4. Similar with the third embodiment, a plurality of third pixel electrodes 112-3 and a plurality of third switches 114-3 as well as a plurality of fourth pixel electrodes 112-4 and a plurality of fourth switches 114-4 corresponding to the plurality of second pixels can be achieved by means of the technology similar with that for fabricating an array substrate of a crystal liquid panel, which will not be reiterated herein.

Figure 1H:
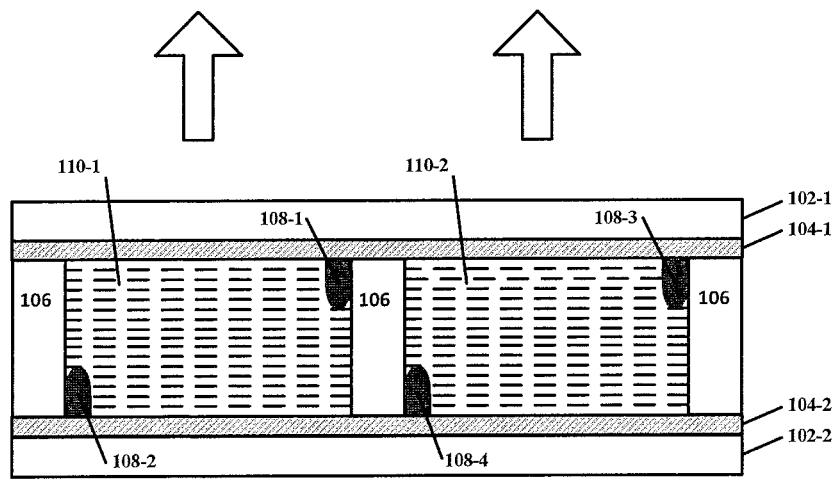

FIG. 1H is a schematic diagram showing the cross sectional view of a display panel according to an eighth embodiment of the present disclosure. The eighth embodiment differs from the fifth embodiment in that: in the eighth embodiment, the first colored fluid layer 108-1 is positioned on one side of left and right sides of the first pixel when present as dot shape, and the second colored fluid layer 108-2 is positioned on the other side of left and right sides of the first pixel when present as dot shape. The third colored fluid layer 108-3 is positioned on one side of left and right sides of the second pixel when present as dot shape, and the fourth colored fluid layer 108-4 is positioned on the other side of left and right sides of the second pixel when present as dot shape. However, in the fifth embodiment, the relative position between the first colored fluid layer and the second colored fluid layer and the relative position between the third colored fluid layer and the fourth colored fluid layer are not particularly limited.

As such, in the eighth embodiment, when observing perpendicular to the display panel, the third colored fluid layer 108-3 and the fourth colored fluid layer 108-4 can spread without overlapping with each other, such that a mixed color of the third color and the fourth color can be displayed.

Figure 1I:
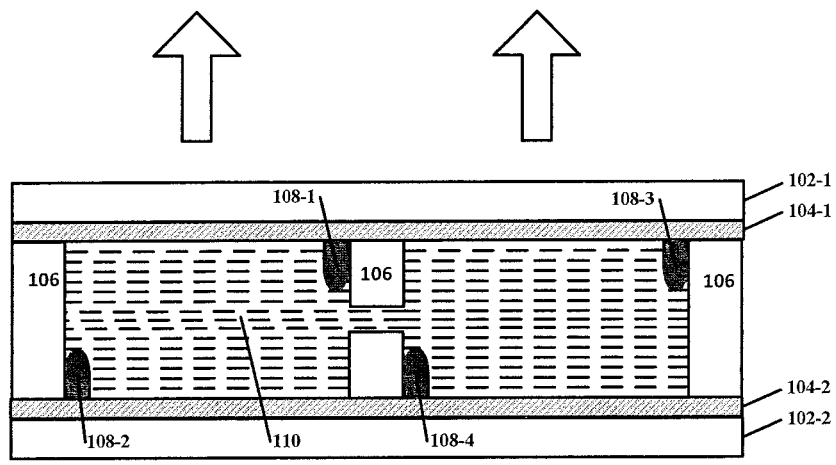

FIG. 1I is a schematic diagram showing the cross sectional view of a display panel according to a ninth embodiment of the present disclosure. The ninth embodiment differs from the eighth embodiment in that: the first pixel and the adjacent second pixel are separated from each other by a pixel wall 106 and an opening is provided on the pixel wall 106. A distance between the opening and the first insulating layer 104-1 is greater than a thickness of each of the first colored fluid layer 108-1 and the third colored fluid layer 108-3 when present as dot shape. A distance between the opening and the second insulating layer 104-2 is greater than a thickness of each of the second colored fluid layer 108-2 and the fourth colored fluid layer 108-4 when present as dot shape. As such, the colored fluid layers in one pixel will not be mixed into another pixel through the opening.

In the fifth to ninth embodiments above, one of the first and second colors may be one color selected from three primary colors, and the other one of the first and second colors may be the complementary color to the one color. One of the third and fourth colors may be another color selected from three primary colors, and the other one of the third and fourth colors may be the complementary color to the another color.

As such, in addition to that white color, the one color and the complementary color thereto can be displayed, the color of the backlight can be fully absorbed by two colored fluid layers whose colors are complementary to each other, when the first colored fluid layer 108-1 spreads to cover the surface of the first insulating layer 104-1 corresponding to the first pixel and the second colored fluid layer 108-2 spreads to cover the surface of the second insulating layer 104-2 corresponding to the first pixel, so as to display black color. Similarly, in addition to that white color, the another color and the complementary color thereto can be displayed, the color of the backlight can be fully absorbed by two colored fluid layers whose colors are complementary to each other, when the third colored fluid layer 108-3 spreads to cover the surface of the first insulating layer 104-1 corresponding to the second pixel and the fourth colored fluid layer 108-4 spreads to cover the surface of the second insulating layer 104-2 corresponding to the second pixel, so as to display black color.

The embodiments shown in FIG. 1H and FIG. 1I will be described in detail below in the case that the first color and the second color are complementary to each other, with one of the first and second colors being one color selected from three primary colors, and the third color and the fourth color are complementary to each other, with one of the third and fourth colors being another color selected from three primary colors.

As shown in FIG. 1H and FIG. 1I, the display panel comprises: the first substrate 102-1, the first insulating layer 104-1, a plurality of pixels separated from each other by a pixel wall 106, the second insulating layer 104-2, and the second substrate 102-2, disposed from top to bottom. Although these figures only show a set of pixel walls extending along a direction perpendicular to the paper surface of FIG. 1, the display panel may also comprise another set of pixel walls extending along a direction in parallel with the paper surface of FIG. 1. These two sets of pixel walls confine the plurality of first pixels and the plurality of second pixels.

The first pixel and the second pixel adjacent thereto respectively comprise: colored fluid layers having the same hydrophilicity/hydrophobicity as that of the near surfaces of the first insulating layer 104-1 and the second insulating layer 104-2 (colored fluid layers 108-1 and 108-2 for the first pixel, and colored fluid layers 108-3 and 108-4 for the second pixel), and transparent conductive fluids filled in respective pixels and having a hydrophilicity/hydrophobicity contrary to that of the colored fluid layers (110-1 and 110-2 in FIG. 1H, or 110 in FIG. 1I). As such, because the transparent conductive fluids in the first and second pixels have a hydrophilicity/hydrophobicity contrary to that of the colored fluid layers, they can form an interface with corresponding colored fluid layers. Because the near surfaces of the first and second insulating layers have the same hydrophilicity/hydrophobicity as that of the colored fluid layers, they can form a good adhesion with corresponding colored fluid layers.

The colored fluid layers in the first pixels include: the first colored fluid (for example ink) layer 108-1 attached to the first insulating layer 104-1 and having the first color, and the second colored fluid (for example ink) layer 108-2 attached to the second insulating layer 104-2 and having the second color. The second color is the complementary color of the first color, and one of the first and second colors is one color selected from three primary colors (for example, denoted as $C_{B1}$). As such, the other of the first and second colors is $C_w$–$C_{B1}$, wherein $C_w$ represents white color. As shown in the figures, the first colored fluid layer 108-1 is positioned on the right side of the first pixel when it shrinks to dot shape, and the second colored fluid layer 108-2 is positioned on the left side of the first pixel when it shrinks to dot shape.

The colored fluid layers in the second pixels include: the third colored fluid (for example ink) layer 108-3 attached to the first insulating layer 104-1 and having the third color, and the fourth colored fluid (for example ink) layer 108-4 attached to the second insulating layer 104-2 and having the fourth color. The fourth color is the complementary color of the third color, and one of the third and fourth colors is another color selected from three primary colors (for example, denoted as $C_{B2}$). As such, the other of the third and fourth colors is $C_w$–$C_{B2}$. As shown in the figures, the third colored fluid layer 108-3 is positioned on the right side of the second pixel when it shrinks to dot shape, and the fourth colored fluid layer 108-4 is positioned on the left side of the second pixel when it shrinks to dot shape.

A common voltage can be applied to the transparent conductive fluids (110-1 and 110-2 in FIG. 1H, or 110 in FIG. 1I). For example, the transparent conductive fluids may be configured to be electrically connected to the common electrode 116 which applies the common voltage. As such, the two substrates may share the transparent conductive fluids without affecting display. As one example, in the case where various pixels are not in communication with each other (for example, as shown in FIG. 1H), a common electrode may be disposed on any set of the above two sets of pixel walls, or partially on one set of pixel walls and partially on the other set of pixel walls, as long as a common voltage is applied to the transparent conductive fluids in each pixel. As another example (for example, as shown in FIG. 1I), in the case where various pixels are in communication with each other via for example the opening provided on the pixel wall (wherein FIG. 1I is a schematic diagram showing the cross sectional view taken along the plane perpendicular to the substrate and through the center of the opening), an external electrode may be used to apply a common voltage to the transparent conductive fluids in one or more pixels positioned on the outmost side of the display panel. As shown in FIG. 1I, the distances between the opening and the first and second insulating layers may both be greater than the thicknesses of the colored fluid layers when they shrink to dot shape. As such, the colored fluid layers in one pixel will not be mixed into another pixel through the opening.

The first insulating layer 104-1 can implement the insulation between the colored fluid layers (for example the first colored fluid layer 108-1 and the third colored fluid layer 108-3) attached thereon and the pixel electrodes 112-1 and 112-3, to avoid that the colored fluid (for example ink) is electrolyzed under the influence of the pixel electrodes. Similarly, the insulating layer 104-2 can implement the insulation between the colored fluid layers (for example the second colored fluid layer 108-2 and the fourth colored fluid layer 108-4) attached thereon and the pixel electrodes 112-2 and 112-4, to avoid that the colored fluid (for example ink) is electrolyzed under the influence of the pixel electrodes. As one example, in the case that the colored fluid layer is an ink layer, the insulating layers 104-1 and 104-2 may be made from hydrophobic materials such as poly-p-xylene (parylene), silicon oxide (SiOx), silicon nitride (SiNx), polyvinyldifluoride, lead zirconate titanate (PZT), barium strontium titanate (BST) or the like, and the thickness thereof may range from 0.1 to 1 µm, for example. As another example, in the case that the colored fluid layer is an ink layer, the insulating layers 104-1 and 104-2 may include a non-hydrophobic material layer, and a hydrophobic material layer is disposed on one side of the non-hydrophobic material layer facing towards the transparent conductive fluid, such that the resulting insulating layer has a hydrophobic surface. The hydrophobic material layer can employ hydrophobic polymers including fluorine-containing polymers, and the thickness thereof may range from 1 to 10 nm, for example. As such, because the surfaces of the first and second insulating layers facing towards the transparent conductive fluids are hydrophobic (i.e. having the same hydrophilicity/hydrophobicity as those of the colored fluid layers), they can form a good adhesion with corresponding ink layers. The insulating layers 104-1 and 104-2 may be formed by deposition, coating, or the like on the substrates 102-1 and 102-2 respectively. The pixel wall 106 can confine a pixel, and may be made from a hydrophilic or hydrophobic photoresist material. The photoresist material can be a positive or negative photoresist. The use of negative photoresist has advantages of low cost and high production, but the resolution obtained with negative photoresist is not as good as positive photoresist. Because the resolution obtained with negative photoresist is usually sufficient for the pixel wall, negative photoresist is used in view of cost. In the case that the colored fluid layer is an ink layer, when the surface of the pixel wall is hydrophilic (i.e. having a hydrophilicity/hydrophobicity contrary to those of the colored fluid layers), it can be avoid that the diffusion of the ink layer on the insulating layer is influenced due to the adhesion between the pixel wall and corresponding ink layer. The pixel wall 106 may be formed on the substrate 102-1 or 102-2 by means of etching.

A common voltage can be applied to the colored fluid layers (for example, the first to fourth colored fluid layers 108-1 to 108-4) via the transparent conductive fluid. In the case that the colored fluid layer is an ink layer, the transparent conductive fluid may be made from a hydrophilic fluid (such as water, aqueous inorganic salt-containing solution, mixed liquid of aqueous solution of inorganic salt and ethanol, and the like). Because the transparent conductive fluids are hydrophilic (i.e., having a hydrophilicity/hydrophobicity contrary to those of the colored fluid layers), they can form an interface with corresponding ink layers.

The first to fourth colored fluid layers 108-1 to 108-4 can form color display, and it can be achieved by using for example the existing inks for electrowetting display technology. For example, the ink may contain a lipophilic fluid and a pigment mixed in the lipophilic fluid. The lipophilic fluid may be selected from lipophilic organic solvents such as alkanes, benzene, toluene, and the like.

As described previously, one of the first and second colors is one color $C_{B1}$ selected from three primary colors, and the other of the first and second colors is the complementary color to $C_{B1}$, i.e. $C_w$–$C_{B1}$. One of the third and fourth colors is another color $C_{B2}$ selected from three primary colors, and the other of the third and fourth colors is the complementary color to $C_{B2}$, i.e. $C_W$–$C_{B2}$. As such, by controlling the shrinkage/spread states of the first to fourth colored fluid layers, the first and second pixels can display $C_{B1}$, $C_w$–$C_{B1}$, $C_{B2}$ and $C_w$–$C_{B2}$. By controlling the shrinkage/spread states of the first to fourth colored fluid layers, a mixed color of the two complementary colors, i.e. the third color selected from three primary colors ($C_w$–$C_m$+$C_w$–$C_{B2}$=$C_w$–($C_m$+$C_{B2}$)=$C_{B3}$, wherein $C_{B3}$ is the third color selected from three primary colors), can also be displayed. By shrinking all of the first to fourth colored fluid layers to dot shape, white color can be displayed. By spreading all of the first to fourth colored fluid layers to cover the pixel surfaces thereof, the color of the backlight can be fully absorbed by the two pixels because the first color is complementary to the second color and the third color is complementary to the fourth color, so as to display black color. By spreading the first and second colored fluid layers without overlapping with each other when observing perpendicular to the display panel, and spreading the third and fourth colored fluid layers without overlapping with each other when observing perpendicular to the display panel, three primary colors can be displayed at the same time, so as to display a mixed color of three primary colors. Thus, full color display can be achieved by using two pixels, thereby significantly improving display resolution.

For the above-mentioned embodiment where various pixels are not in communication with each other (see FIG. 1A), the preparation method for the display panel may comprise, for example, the following steps. First, in a first step, fabricated are substrates 102-1 and 102-2 on which pixel electrodes and switches may be formed. Next, in a second step, insulating layers 104-1 and 104-2 are formed on the substrates 102-1 and 102-2 respectively. As described previously, this can be realized by means of deposition, coating, or the like. Next, in a third step, a pixel wall is formed on one (for example, 104-2) of the insulating layers 104-1 and 104-2, so as to confine a plurality of pixels. As described previously, this can be realized by means of etching. Next, in a fourth step, corresponding colored fluid (for example ink) layers are respectively placed at positions on the insulating layers 104-1 and 104-2 corresponding to respective pixels. For the insulating layer on which no pixel wall is formed (for example, 104-1), a colored fluid (for example ink) layer may be placed thereon by for example printing. For instance, a groove may be formed at corresponding position of each pixel to fix the position of the colored fluid (for example ink) layer. Next, in a fifth step, a transparent conductive fluid is filled into respective pixels on the insulating layer 104-2. Next, in a sixth step, the substrate 102-1 with a colored fluid (for example ink) layer placed thereon is aligned with the substrate 102-2 provided with a pixel wall, to form a display panel.

For the above-mentioned embodiment where various pixels are in communication with each other (see FIG. 1I), the preparation method for the display panel may comprise, for example, the following steps. First, in a first step, substrates 102-1 and 102-2 are fabricated. Next, in a second step, insulating layers 104-1 and 104-2 are formed on the substrates 102-1 and 102-2 respectively. As described previously, this can be realized by means of deposition, coating, or the like. Next, in a third step, pixel walls are formed on the insulating layers 104-1 and 104-2 respectively, and a periphery pixel wall is formed on one (for example, 104-2) of the insulating layers 104-1 and 104-2, the height of the periphery pixel wall being greater than the sum of the heights of the pixel walls formed on the insulating layers 104-1 and 104-2. As described previously, this can be realized by means of etching. Next, in a fourth step, corresponding colored fluid (for example ink) layers are respectively placed at positions on the insulating layers 104-1 and 104-2 corresponding to respective pixels. For example, a groove may be formed at corresponding position of each pixel to fix the position of the colored fluid (for example ink) layer. Next, in a fifth step, a transparent conductive fluid is filled into respective pixels on the insulating layer 104-2. Next, in a sixth step, the substrate 102-1 with a colored fluid (for example ink) layer placed thereon is aligned with the substrate 102-2 provided with a periphery pixel wall, to form a display panel. At this time, because the height of the periphery pixel wall is greater than the sum of the heights of the pixel walls formed on the insulating layers 104-1 and 104-2, various pixels are in communication with each other via openings between the pixel walls formed on the insulating layers 104-1 and 104-2.

It should be noted that in the examples described above, because the colored fluid layer employs an oily fluid (lipophilic and hydrophobic), the transparent conductive fluid is hydrophilic, the surface of the insulating layer facing towards the transparent conductive fluid is hydrophobic, and the surface of the pixel wall is hydrophilic but may also be hydrophobic. However, the present disclosure is not limited thereto. As another example, the colored fluid layer may also employ a hydrophilic fluid, in which an inorganic pigment (for example, red inorganic pigment may be iron oxide red, green inorganic pigment may be chromium oxide green or lead chrome green, and blue inorganic pigment may be iron blue, cobalt blue or ultramarine) is mixed. In this example, the transparent conductive fluid is hydrophobic, the surface of the insulating layer facing towards the transparent conductive fluid is hydrophilic, and the surface of the pixel wall is hydrophobic but may also be hydrophilic.

In addition, the first colored fluid layer 108-1 may be positioned on the left side of the first pixel when it shrinks to dot shape, and the second colored fluid layer 108-2 is positioned on the right side of the first pixel when it shrinks to dot shape. That is, it is only required that the first and second colored fluid layers are respectively positioned on one side and the other side of left and right sides of the first pixel when they shrink to dot shape. Likewise, the third colored fluid layer 108-3 may be positioned on the left side of the second pixel when it shrinks to dot shape, and the fourth colored fluid layer 108-4 is positioned on the right side of the second pixel when it shrinks to dot shape. That is, it is only required that the third and fourth colored fluid layers are respectively positioned on one side and the other side of left and right sides of the second pixel when they shrink to dot shape.

Figure 2A:
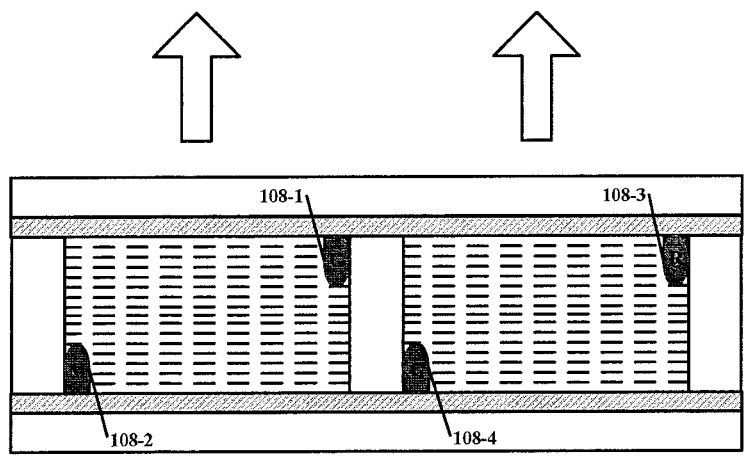
FIGS. 2A-2I are schematic diagrams illustrating the color display process of a display panel according to an embodiment of the present disclosure.

FIGS. 2A-2I are schematic diagrams illustrating the color display process of a display panel according to an embodiment of the present disclosure. In a first embodiment shown in FIGS. 2A-2I, the first color is green color (G) selected from three primary colors, the second color is the complementary color to green color (magenta color (M), absorbing green light and emitting red light and blue light), the third color is red color (R) selected from three primary colors, and the fourth color is the complementary color to red color (cyan color (C), absorbing red light and emitting blue light and green light). As shown in FIG. 2A, when an electric field with a first intensity is applied to the first to fourth colored fluid (for example ink) layers 108-1 to 108-4, they can shrink to dot shape. At this time, in a display device using this display panel, a white light emitted by a backlight source disposed for example under the second substrate 102-2 can be transmitted through the first and second pixels, so as to display white color.

Figure 2B:
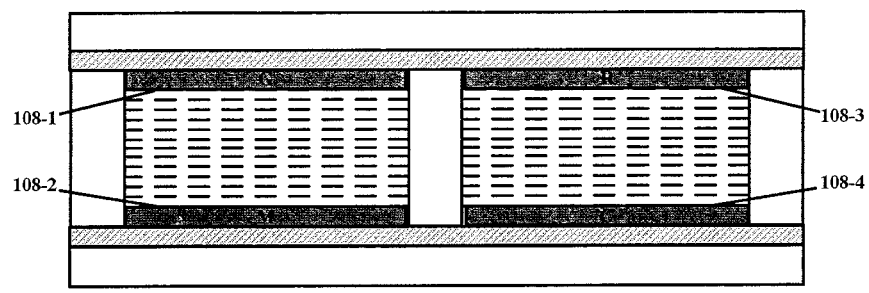

As shown in FIG. 2B, when an electric field with a second intensity is applied to the first to fourth colored fluid (for example ink) layers 108-1 to 108-4, they can spread to cover the whole surface of respective pixels. At this time, because the first color (i.e. green color (G)) and the second color (i.e. magenta color (M)) are complementary to each other and the third color (i.e. red color (R)) and the fourth color (i.e. cyan color (C)) are complementary to each other, the white light emitted by the backlight source can be fully absorbed by the first and second colored fluid layers 108-1 and 108-2 of the first pixel and can be fully absorbed by the third and fourth colored fluid layers 108-3 and 108-4 of the second pixel, so as to display black color.

Figure 2C:
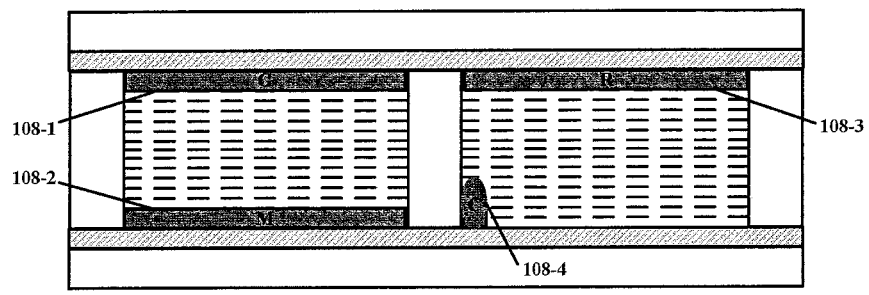

As shown in FIG. 2C, when the electric field with the first intensity is applied to the fourth colored fluid layer 108-4 with the complementary color (cyan color (C)) to red color (R) and the electric field with the second intensity is applied to the other three colored fluid layers 108-1, 108-2 and 108-3, the fourth colored fluid layer 108-4 can shrink to dot shape and the other three colored fluid layers 108-1, 108-2 and 108-3 can spread to cover the whole surface of respective pixels. At this time, a white light emitted by the backlight source can be fully absorbed by the first and second colored fluid layers 108-1 and 108-2 of the first pixel, such that the first pixel displays black color. Meanwhile, the third colored fluid layer 108-3 with red color (R) only transmits the red component of the white light emitted by the backlight source, such that the second pixel displays red color.

Figure 2D:
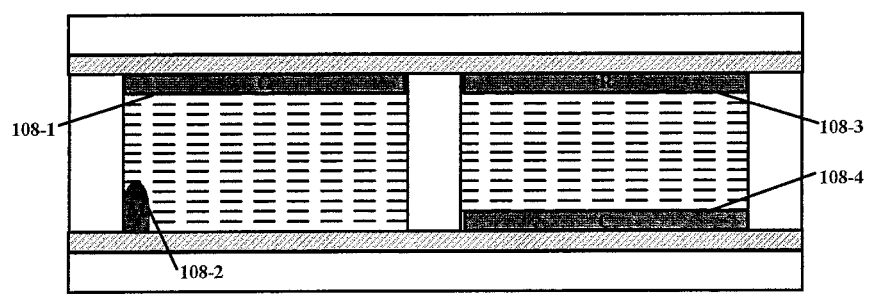

As shown in FIG. 2D, when the electric field with the first intensity is applied to the second colored fluid layer 108-2 with the complementary color (magenta color (M)) to green color (G) and the electric field with the second intensity is applied to the other three colored fluid layers 108-1, 108-3 and 108-4, the second colored fluid layer 108-2 can shrink to dot shape and the other three colored fluid layers 108-1, 108-3 and 108-4 can spread to cover the whole surface of respective pixels. At this time, the white light emitted by the backlight source can be fully absorbed by the third and fourth colored fluid layers 108-3 and 108-4 of the second pixel, such that the second pixel displays black color. Meanwhile, the first colored fluid layer 108-1 with green color (G) only transmits the green component of the white light emitted by the backlight source, such that the first pixel displays green color.

Figure 2E:
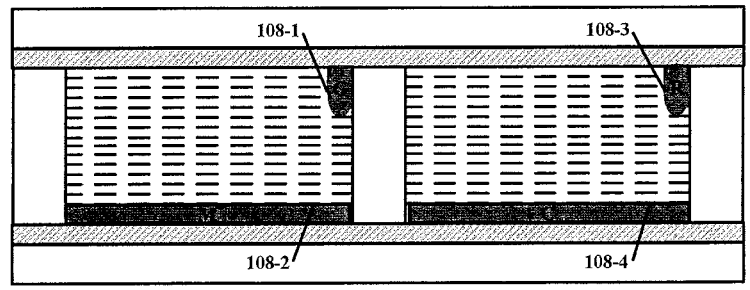

As shown in FIG. 2E, when the electric field with the first intensity is applied to two colored fluid layers 108-1 and 108-3 respectively with green color (G) and red color (R) and the electric field with the second intensity is applied to the other two colored fluid layers 108-2 and 108-4, the first and third colored fluid layers 108-1 and 108-3 can shrink to dot shape and the other two colored fluid layers 108-2 and 108-4 can spread to cover the whole surface of respective pixels. At this time, the second colored fluid layer 108-2 with magenta color (M) only transmits the magenta component of the white light emitted by the backlight source, such that the first pixel displays magenta color. Meanwhile, the fourth colored fluid layer 108-4 with cyan color (C) only transmits the cyan component of the white light emitted by the backlight source, such that the second pixel displays cyan color. Blue color will be produced when magenta color of the first pixel and cyan color of the second pixel are mixed, such that the first and second pixels as a whole will display blue color, i.e. the third color of three primary colors.

In addition, an electric field with an intensity between the first intensity and the second intensity can be applied to one or more of the first to fourth colored fluid layers 108-1 to 108-4, so as to display various other colors and gray scale. For example, corresponding electric fields can be applied to the first to fourth colored fluid layers 108-1 to 108-4 respectively, such that the first and second colored fluid layers 108-1 and 108-2 spread without overlapping with each other when observing perpendicular to the display panel, and the third and fourth colored fluid layers 108-3 and 108-4 spread without overlapping with each other when observing perpendicular to the display panel, so as to display three primary colors of red, green and blue at the same time, and thus a mixed color of three primary colors is displayed. As such, full color display can be achieved by using two pixels, thereby improving display resolution by 33%.

Figure 2F:
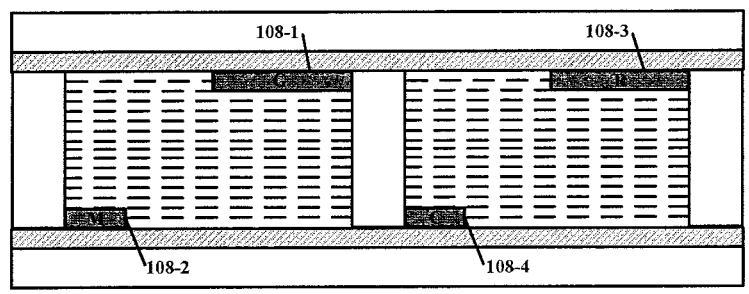

For example, as shown in FIG. 2F, when the electric fields respectively applied to the colored fluid layers 108-1 and 108-3 with green color (G) and red color (R) are greater than those respectively applied to the colored fluid layers 108-2 and 108-4 with magenta color (M) and cyan color (C) respectively, the respective proportions of green color (G) and red color (R) are greater than the proportion of blue color (B) produced by mixing magenta color (M) and cyan color (C). At this time, the blue color (B) light is mixed with a portion of green color (G) light and a portion of red color (R) light to produce white light, with the other portion of green color (G) light and the other portion of red color (R) light remaining, as a result, the light produced by mixing the lights with these colors is W+R+G, wherein W is white light. In addition, it should be noted that although the colored fluid layer 108-1 with green color (G) and the colored fluid layer 108-3 with red color (R) spread to the same area in FIG. 2F, this is only an exemplary example. The colored fluid layer 108-1 with green color (G) and the colored fluid layer 108-3 with red color (R) may certainly spread to different areas. This also applies to the spread areas shown in FIGS. 2G-2I.

Figure 2G:
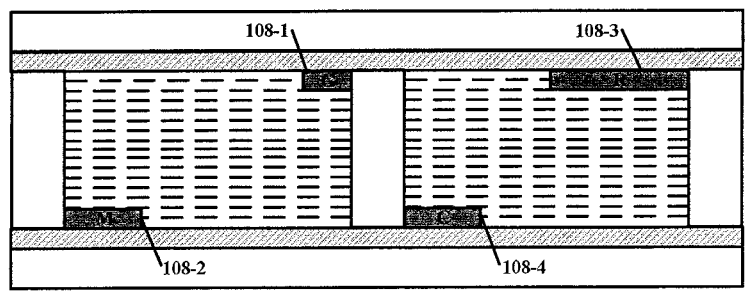

Also, for example, as shown in FIG. 2G, when the electric field applied to the colored fluid layer 108-3 with red color (R)>the electric fields respectively applied to the colored fluid layers 108-2 and 108-4 with magenta color (M) and cyan color (C)>the electric field applied to the colored fluid layer 108-1 with green color (G), the proportion of red color (R)>the proportion of blue color (B) produced by mixing magenta color (M) and cyan color (C)>the proportion of green color (G). At this time, green color (G) light is mixed with a portion of blue color (B) light and a portion of red color (R) light to produce white light, and the remaining blue color (B) light is mixed with a portion of red color (R) light to produce magenta color (M) light, as a result, the light produced by mixing the lights with these colors is W+M+R.

Figure 2H:
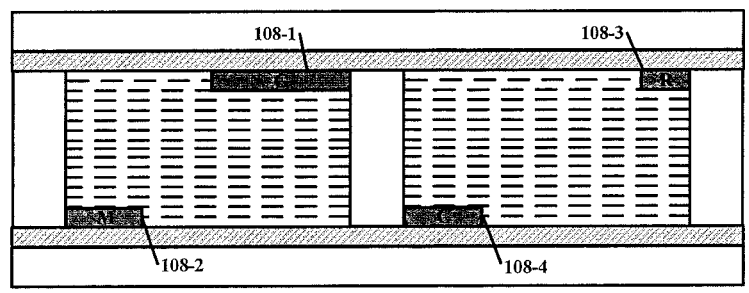

Also, for example, as shown in FIG. 2H, when the electric field applied to the colored fluid layer 108-1 with green color (G)>the electric fields respectively applied to the colored fluid layers 108-2 and 108-4 with magenta color (M) and cyan color (C)>the electric field applied to the colored fluid layer 108-3 with red color (R), the proportion of green color (G)>the proportion of blue color (B) produced by mixing magenta color (M) and cyan color (C)>the proportion of red color (R). At this time, red color (R) light is mixed with a portion of blue color (B) light and a portion of green color (G) light to produce white light, and the remaining blue color (B) light is mixed with a portion of green color (G) light to produce cyan color (C) light, as a result, the light produced by mixing the lights with these colors is W+C+G.

Figure 2I:
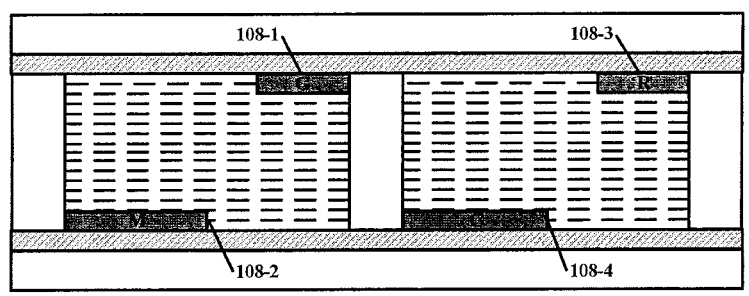

Also, for example, as shown in FIG. 2I, when the electric fields respectively applied to the colored fluid layers 108-2 and 108-4 with magenta color (M) and cyan color (C) are greater than those respectively applied to the colored fluid layers 108-1 and 108-3 with green color (G) and red color (R), the proportion of blue color (B) produced by mixing magenta color (M) and cyan color (C) is greater than the respective proportions of green color (G) and red color (R). At this time, in the case that the proportion of red color (R) is greater than that of green color (G), green color (G) light is mixed with a portion of red color (R) light and a portion of blue color (B) light to produce white light, as a result, the light produced by mixing the lights with these colors is W+B+M. In the case that the proportion of red color (R) is smaller than that of green color (G), red color (R) light is mixed with a portion of green color (G) light and a portion of blue color (B) light to produce white light, as a result, the light produced by mixing the lights with these colors is W+B+C. In the case that the proportion of red color (R) is equal to that of green color (G), red color (R) light and green color (G) are mixed with a portion of blue color (B) light to produce white light, as a result, the light produced by mixing the lights with these colors is W+B. It should be noted that although the figure shows that each of magenta color (M) and cyan color (C) occupies 50% of the surface of corresponding pixel to allow blue color (B) obtained by mixing to occupy 50% of the surface of one pixel, the present disclosure is not limited thereto. Depending on practical requirements, for example, the percentage of one pixel surface occupied by blue color (B) may also be any other suitable value. In addition, as described previously, the colored fluid layer 108-2 with magenta color (M) may also be positioned on the right side of the first pixel, and the colored fluid layer 108-1 with green color (G) may also be positioned on the left side of the first pixel. As such, the colored fluid layer 108-2 with magenta color (M) can be closer to the colored fluid layer 108-4 with cyan color (C), so as to be more beneficial to being mixed into blue color (B).

In addition, it should be noted that the first embodiment described above is only an exemplary example for illustrating the principle of the present disclosure. As a second embodiment, the first color is green color (G), the second color is magenta color (M), the third color is blue color (B), and the fourth color is yellow color (Y, absorbing blue light and emitting red light and green light). As a third embodiment, the first color is red color (R), the second color is cyan color (C), the third color is blue color (B), and the fourth color is yellow color (Y). In the first to third embodiments, the first color and the second color are interchangeable, or the third color and the fourth color can be interchangeable. That is, it is only required that the second color is the complementary color to the first color, with one of the first and second colors being one color selected from three primary colors, and the fourth color is the complementary color to the third color, with one of the third and fourth colors being another color selected from three primary colors.

In addition, the ink layer with magenta color (M) may contain an organic pigment of formula (I) (i.e. green light-absorbing organic pigment) when used in combination with a quantum dot backlight source,

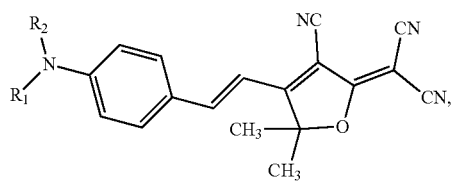

(I)

wherein $R_1$ and $R_2$ are the same or different, and selected from the group consisting of —H, —(CH$_2$)$_n$—CH$_3$, —CH$_2$(CH$_2$)$_n$OH,

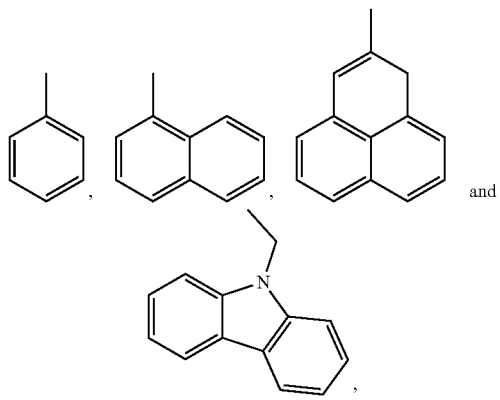

n is independently an integer of 0-10 at each occurrence.

In addition, the ink layer with cyan color (C) may contain an organic pigment of formula (II) (i.e. red light-absorbing organic pigment) when used in combination with a quantum dot backlight source,

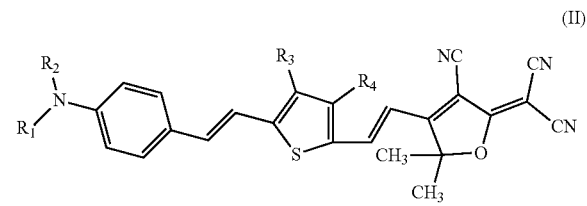

(II)

wherein $R_1$ and $R_2$ are the same or different, and selected from the group consisting of —H, —(CH$_2$)$_n$—CH$_3$, —CH$_2$(CH$_2$)$_n$OH,

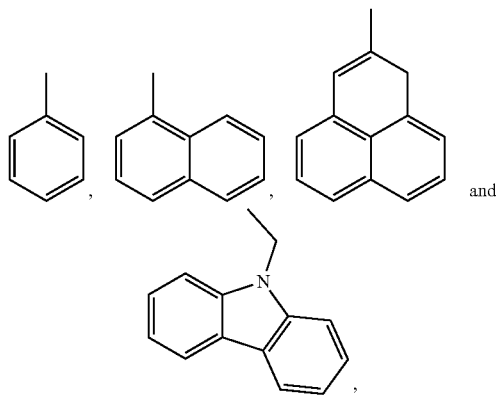

$R_3$ and $R_4$ are the same or different, and selected from the group consisting of —H, —(CH$_2$)$_n$—CH$_3$, —CH$_2$(CH$_2$)$_n$OH, —O—(CH$_2$)$_n$—CH$_3$, —O—CH$_2$(CH$_2$)$_n$OH,

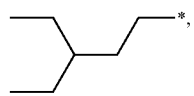

—O—Si(CH$_3$)$_3$ and —O—C(CH$_3$)$_2$—Si(CH$_3$)$_3$, n is independently an integer of 0-10 at each occurrence, and the symbol * represents a linking site.

In addition, the ink layer with yellow color may contain an organic pigment of formula (III) (i.e. blue light-absorbing organic pigment) when used in combination with a quantum dot backlight source,

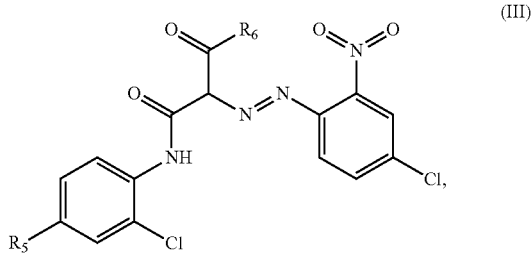

wherein $R_5$ and $R_6$ are the same or different, and selected from the following group —H, —$(CH_2)_n$—$CH_3$, —$CH_2(CH_2)_n OH$,

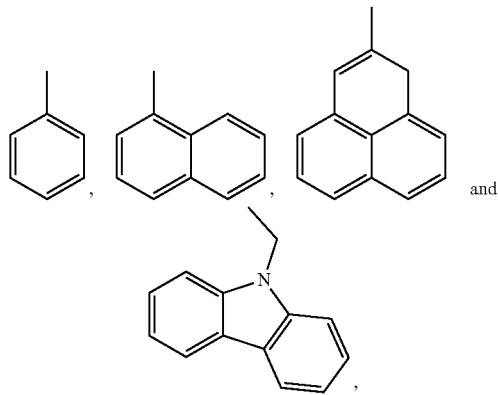

n is independently an integer of 0-10 at each occurrence.

Similarly, red ink layer may contain a mixture of the organic pigment of formula (I) (i.e. magenta pigment) and the organic pigment of formula (III) (i.e. yellow pigment) when used in combination with a quantum dot backlight source. In addition, green ink layer may contain a mixture of the organic pigment of formula (II) (i.e. cyan pigment) and the organic pigment of formula (III) (i.e. yellow pigment) when used in combination with a quantum dot backlight source. In addition, blue ink layer may contain a mixture of the organic pigment of formula (I) (i.e. magenta pigment) and the organic pigment of formula (II) (i.e. cyan pigment) when used in combination with a quantum dot backlight source. As such, by the use of the above organic pigments and the combination with a quantum dot backlight source, the color gamut of the color display can be further improved.

II. Display Device

The display device according to embodiments of the present disclosure at least comprises the display panel according to above described embodiments of the present disclosure. Due to the use of this display panel, full color display can be achieved by using two pixels, thereby significantly improving display resolution, which will not be reiterated herein.

Figure 3:
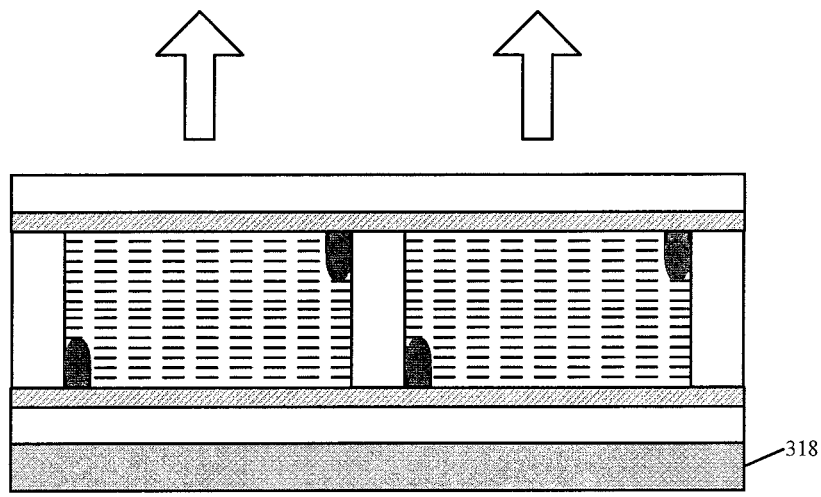
FIG. 3 is a schematic diagram showing the cross sectional view of a display device according to an embodiment of the present disclosure.

FIG. 3 is schematic diagram showing the cross sectional view of a display device according to an embodiment of the present disclosure. In this example shown in FIG. 3, in addition to the display panel shown in FIG. 1H, the display device also comprises a backlight source 318. The backlight source may be a common backlight source (for example LED backlight source) or a quantum dot backlight source. As described previously, in the case that a white light quantum dot backlight source is used in combination with the above organic pigments, the color gamut of the color display can be further improved. Optionally, the display device according to embodiments of the present disclosure may also comprise a backlight source and the display panel shown in FIGS. 1A-1G or FIG. 1I.

III. Control Method

Figure 4:
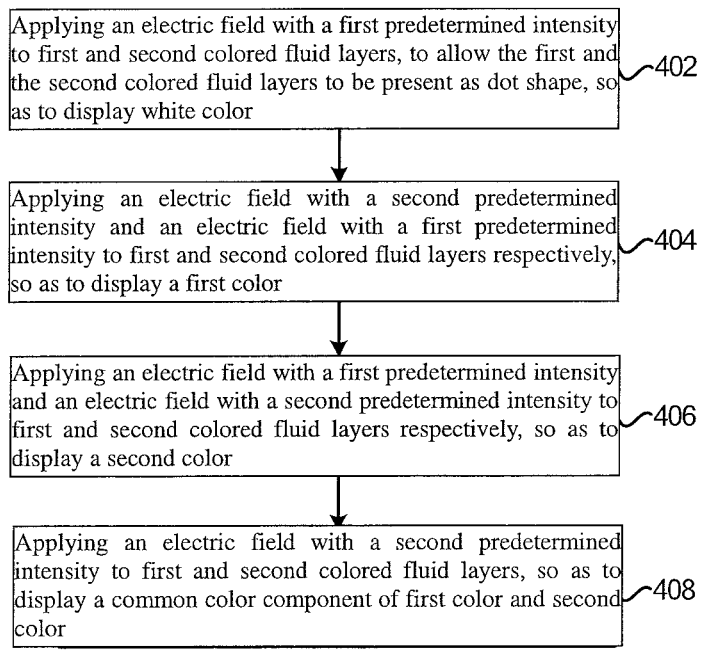
FIG. 4 is a flow chart of a control method according to one embodiment of the present disclosure.

FIG. 4 is a flow chart of a control method according to one embodiment of the present disclosure. This control method can be executed by a driving module for driving the display panel. In step 402, for example, in response to an image signal which lets one pixel display white color, an electric field with a first predetermined intensity is applied to the first and second colored fluid layers, to allow the first and second colored fluid layers to be present as dot shape, so as to display white color. In step 404, for example, in response to an image signal which lets one pixel display the first color, an electric field with a second predetermined intensity and the electric field with the first predetermined intensity are applied to the first and second colored fluid layers respectively, to allow the first colored fluid layer to spread to cover the surface of the first insulating layer corresponding to the first pixel, and to allow the second colored fluid layer to be present as dot shape, so as to display the first color. In step 406, for example, in response to an image signal which lets one pixel display the second color, the electric field with the first predetermined intensity and the electric field with the second predetermined intensity are applied to the first and second colored fluid layers respectively, to allow the first colored fluid layer to be present as dot shape, and to allow the second colored fluid layer to spread to cover the surface of the second insulating layer corresponding to the first pixel, so as to display the second color. In step 408, for example, in response to an image signal which lets one pixel display the common component of the first color and the second color, the electric field with the second predetermined intensity is applied to the first and second colored fluid layers, to allow the first colored fluid layer to spread to cover the surface of the first insulating layer corresponding to the first pixel, and to allow the second colored fluid layer to spread to cover the surface of the second insulating layer corresponding to the first pixel, so as to display the common color component of the first color and the second color.

Figure 5:
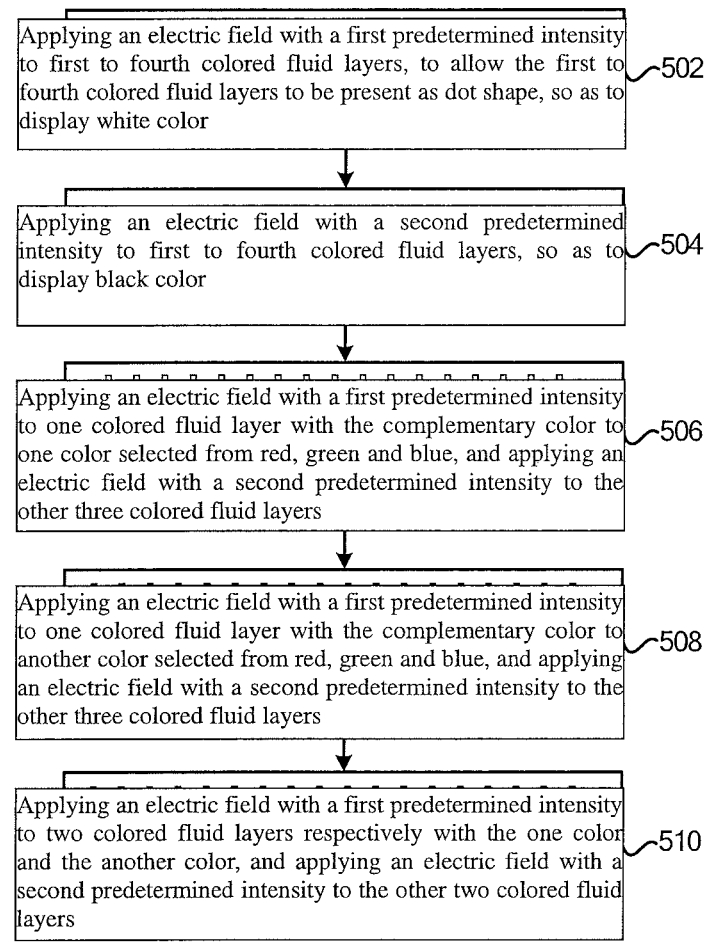
FIG. 5 is a flow chart of a control method according to another embodiment of the present disclosure.

FIG. 5 is a flow chart of a control method according to another embodiment of the present disclosure. This control method can be executed by a driving module for driving the display panel. In step 502, for example, in response to an image signal which lets one pixel display white color, an electric field with a first predetermined intensity is applied to the first to fourth colored fluid layers, to allow the first to fourth colored fluid layers to be present as dot shape, so as to display white color (see FIG. 2A). In step 504, for example, in response to an image signal which lets one pixel display black color, an electric field with a second predetermined intensity is applied to the first to fourth colored fluid layers, to allow the first and third colored fluid layers to spread to cover the surface of the first insulating layer corresponding to the first and second pixels, and to allow the second and fourth colored fluid layers to spread to cover the surface of the second insulating layer corresponding to the first and second pixels, so as to display black color (see FIG. 2B).

In step 506, for example, in response to an image signal which lets one pixel display one color selected from three primary colors, the electric field with the first predetermined intensity is applied to one colored fluid layer with the complementary color to one color selected from red, green and blue, and the electric field with the second predetermined intensity is applied to the other three colored fluid layers, so as to display the one color selected from red, green and blue (see FIG. 2C).

In step 508, for example, in response to an image signal which lets one pixel display another color selected from three primary colors, the electric field with the first predetermined intensity is applied to one colored fluid layer with the complementary color to one color selected from red, green and blue, and the electric field with the second predetermined intensity is applied to the other three colored fluid layers, so as to display the another color selected from red, green and blue (see FIG. 2D).

In step 510, for example, in response to an image signal which lets one pixel display the third color other than the one color and the another color selected from three primary colors, the electric field with the first predetermined intensity is applied to two colored fluid layers respectively with the one color and the another color, and the electric field with the second predetermined intensity is applied to the other two colored fluid layers, so as to display the third color other than the one color and the another color selected from red, green and blue (see FIG. 2E).

As described previously, the control method according to embodiments of the present disclosure may also comprise: applying an electric field with an intensity between the first intensity and the second intensity to one or more of the first to fourth colored fluid layers, so as to display various other colors and gray scale. For example, corresponding electric fields may be applied to the first to fourth colored fluid layers respectively, in such a manner that when observing perpendicular to the display panel, the first and second colored fluid layers spread without overlapping with each other, and the third and fourth colored fluid layers spread without overlapping with each other, so as to display a mixed color of red, green and blue (see FIGS. 2F-2I).

It should be noted that the above steps 402-408 and 502-510 are not necessarily to be performed in the above described sequence, but may be performed in a different sequence, depending on the image signal of the image to be displayed.

The above descriptions are only some exemplary embodiments of the present disclosure, but not intended to limit the protection scope of the present disclosure. The protection scope of the present disclosure is defined by the appended claims.

What is claimed is:

1. A display panel comprising:
    a first substrate and a second substrate opposite to each other; and
    a plurality of first pixels disposed between the first substrate and the second substrate;
    wherein, at least one of the plurality of first pixels comprises:
        a first insulating layer on the first substrate;
        a second insulating layer on the second substrate;
        a first colored fluid layer with a first color, having the same hydrophilicity/hydrophobicity as that of a surface of the first insulating layer, and contacted with the surface of the first insulating layer;
        a second colored fluid layer with a second color, having the same hydrophilicity/hydrophobicity as that of a surface of the second insulating layer and contacted with the surface of the second insulating layer, wherein the second color is different from the first color; and
        a first transparent conductive fluid disposed between the first colored fluid layer and the second colored fluid layer and having a hydrophilicity/hydrophobicity contrary to those of the first colored fluid layer and the second colored fluid layer;
    wherein, the first colored fluid layer is configured to be present as dot shape or spread along the surface of the first insulating layer in a first electric field, and the second colored fluid layer is configured to be present as dot shape or spread along the surface of the second insulating layer in a second electric field.

2. The display panel according to claim 1, wherein, the plurality of first pixels are separated from each other by a pixel wall; and
    the least one of the plurality of first pixels further comprises:
        a common electrode disposed on the pixel wall and configured to apply a common voltage to the first transparent conductive fluid;
        a first pixel electrode disposed between the first insulating layer and the first substrate and configured to generate the first electric field to act on the first colored fluid layer; and
        a second pixel electrode disposed between the second insulating layer and the second substrate and configured to generate the second electric field to act on the second colored fluid layer.

3. The display panel according to claim 2, wherein, the at least one of the plurality of first pixels further comprises:
    a first switch coupled with the first pixel electrode and configured to control the first pixel electrode; and
    a second switch coupled with the second pixel electrode and configured to control the second pixel electrode.

4. The display panel according to claim 1, wherein, one of the first color and the second color is one color selected from red, green and blue, and the other one of the first color and the second color is the complementary color to the one color.

5. The display panel according to claim 4, wherein, the first colored fluid layer is positioned on one side of left and right sides of the at least one of the plurality of first pixels when present as dot shape, and the second colored fluid layer is positioned on the other side of left and right sides of the at least one of the plurality of first pixels when present as dot shape.

6. The display panel according to claim 1, further comprising a plurality of second pixels disposed between the first substrate and the second substrate, wherein, at least one of the plurality of second pixels is disposed adjacent to the at least one of the plurality of first pixels; and
    wherein, the at least one of the plurality of second pixels comprises:
        the first insulating layer on the first substrate;
        the second insulating layer on the second substrate;
        a third colored fluid layer with a third color, having the same hydrophilicity/hydrophobicity as that of the surface of the first insulating layer, and contacted with the surface of the first insulating layer;
        a fourth colored fluid layer with a fourth color, having the same hydrophilicity/hydrophobicity as that of the surface of the second insulating layer and contacted with the surface of the second insulating layer; and
        a second transparent conductive fluid disposed between the third colored fluid layer and the fourth colored fluid layer and having a hydrophilicity/hydrophobicity contrary to those of the third colored fluid layer and the fourth colored fluid layer, wherein, the third colored fluid layer is configured to be present as dot shape or spread along the surface of the first insulating layer in a third electric field, and the fourth colored fluid layer is configured to be present as dot shape or spread along the surface of the second insulating layer in a fourth electric field.

7. The display panel according to claim 6, wherein, the plurality of second pixels are separated from each other by a pixel wall, and at least one of the plurality of second pixels and the at least one of the plurality of first pixels which are adjacent are separated from each other by a pixel wall;

wherein the at least one of the plurality of second pixels further comprises:
a common electrode disposed on the pixel wall and configured to apply a common voltage to the second transparent conductive fluid;
a third pixel electrode disposed between the first insulating layer and the first substrate and configured to generate the third electric field to act on the third colored fluid layer; and
a fourth pixel electrode disposed between the second insulating layer and the second substrate and configured to generate the fourth electric field acting on the fourth colored fluid layer.

8. The display panel according to claim 7, wherein, the at least one of the plurality of second pixels further comprises:
a third switch coupled with the third pixel electrode and configured to control the third pixel electrode; and
a fourth switch coupled with the fourth pixel electrode and configured to control the fourth pixel electrode.

9. The display panel according to claim 6, wherein, the first transparent conductive fluid and the second transparent conductive fluid are the same;
the at least one of the plurality of second pixels and the at least one of the plurality of first pixels which are adjacent are separated from each other by a pixel wall, on which an opening is provided;
a distance between the opening and the first insulating layer is greater than a thickness of each of the first colored fluid layer and the third colored fluid layer when present as dot shape; and
a distance between the opening and the second insulating layer is greater than a thickness of each of the second colored fluid layer and the fourth colored fluid layer when present as dot shape.

10. The display panel according to claim 9, wherein, a surface of the pixel wall has the same hydrophilicity/hydrophobicity as those of the first transparent conductive fluid and the second transparent conductive fluid.

11. The display panel according to claim 6, wherein,
the first colored fluid layer, the second colored fluid layer, the third colored fluid layer and the fourth colored fluid layer are ink; and
the first transparent conductive fluid and the second transparent conductive fluid are hydrophilic.

12. The display panel according to claim 6, wherein,
one of the first color and the second color is one color selected from red, green and blue, and the other one of the first color and the second color is the complementary color to the one color; and
one of the third color and the fourth color is another color selected from red, green and blue, and the other one of the third color and the fourth color is the complementary color to the another color.

13. The display panel according to claim 12, wherein,
the first colored fluid layer is positioned on one side of left and right sides of the at least one of the plurality of first pixels when present as dot shape, and the second colored fluid layer is positioned on the other side of left and right sides of the at least one of the plurality of first pixels when present as dot shape; and
the third colored fluid layer is positioned on one side of left and right sides of the at least one of the plurality of second pixels when present as dot shape, and the fourth colored fluid layer is positioned on the other side of left and right sides of the at least one of the plurality of second pixels when present as dot shape.

14. The display panel according to claim 12, wherein,
the first color is green, the second color is magenta, the third color is red, and the fourth color is cyan.

15. The display panel according to claim 12, wherein,
the first color is green, the second color is magenta, the third color is blue, and the fourth color is yellow.

16. The display panel according to claim 12, wherein,
the first color is red, the second color is cyan, the third color is blue, and the fourth color is yellow.

17. A control method for the display panel according to claim 6, comprising:
applying the first electric field to the first colored fluid layer such that the first colored fluid layer is present as dot shape or spreads along the surface of the first insulating layer corresponding to the at least one of the plurality of first pixels;
applying the second electric field to the second colored fluid layer such that the second colored fluid layer is present as dot shape or spreads along the surface of the second insulating layer corresponding to the at least one of the plurality of first pixels;
applying the third electric field to the third colored fluid layer such that the third colored fluid layer is present as dot shape or spreads along the surface of the first insulating layer corresponding to the at least one of the plurality of second pixels;
applying the fourth electric field to the fourth colored fluid layer such that the fourth colored fluid layer is present as dot shape or spreads along the surface of the second insulating layer corresponding to the at least one of the plurality of second pixels.

18. A display device comprising the display panel according to claim 1.

19. The display device according to claim 18, further comprising a quantum dot backlight source.

20. A control method for the display panel according to claim 1, comprising:
applying the first electric field to the first colored fluid layer such that the first colored fluid layer is present as dot shape or spreads along the surface of the first insulating layer corresponding to the at least one of the plurality of first pixels;
applying the second electric field to the second colored fluid layer such that the second colored fluid layer is present as dot shape or spreads along the surface of the second insulating layer corresponding to the at least one of the plurality of first pixels.

* * * * *